United States Patent [19]

Siegel

[11] Patent Number: 4,846,187
[45] Date of Patent: Jul. 11, 1989

[54] DUAL ISOTOPE SCINTIGRAPHIC IMAGE ENHANCEMENT

[75] Inventor: Jeffry A. Siegel, Voorhees, N.J.

[73] Assignee: The Center for Molecular Medicine and Immunology, Newark, N.J.

[21] Appl. No.: 127,230

[22] Filed: Dec. 1, 1987

[51] Int. Cl.$^4$ .......................... A61K 49/00; A61B 6/00
[52] U.S. Cl. .................................... 128/659; 424/1.1; 424/9
[58] Field of Search .................. 128/1.1, 659; 424/1.1, 424/9; 436/804

[56] References Cited

U.S. PATENT DOCUMENTS 4,348,376  9/1982  Goldenberg ..................... 128/659 X
4,444,744  4/1984  Goldenberg ..................... 128/659 X
4,624,846  11/1986  Goldenberg ..................... 128/659 X

OTHER PUBLICATIONS

Madsen, M. T. et al., "Enhancement of SPECT Images by Fourier Filtering the Projection Image Set", vol. 26, No. 4, published Apr. 1985, pp. 395–402.
Liehn, J. C. et al., "A New Approach to Image Subtraction in Immunoscintigraphy: Preliminary Results", Eur. J. Nucl. Med. (1987) vol. 13, pp. 391–396.
Miller, T. R. et al., "A Practical Method of Image Enhancement by Interactive Digital Filtering", vol. 26, No. 9, publ. Sep. 1985, pp. 1075–1080.
King, M. A. et al., "Two-Dimensional Filtering of Spectral Images Using the Metz and Wiener Filters", Journal of Nuclear Medicine, vol. 25, No. 11, publ. 1984, pp. 1234–1240.
Deland, F. H. et al., "Imaging Approach in Radio Immunodetection", Cancer Research, vol. 40, pp. 3046–3049, Aug. 1980.
Oh, R. J. et al., "The Limitations of Dual Radionuclide Subtraction Technique", British Jrnl. of Radiology, vol. 56, pp. 101–108, Feb. 1983.
Malik, M. H., "Simultaneous Dual Isotope Studies in the Diagnosis of Infection", Jrnl. of Nuclear Medicine, vol. 26, No. 7, Jul. 1985, pp. 722–725.

Primary Examiner—Francis Jaworski
Attorney, Agent, or Firm—Bernhard Saxe

[57] ABSTRACT

An improved method of dual isotope subtraction scintigraphic image processing uses a band pass spatial frequency filter to smooth and enhance the image obtained with the less well resolved isotope and then applies the same filter function to the image from the better resolved isotope, after which the images are subtracted to produce an enhanced image with reduced edge artifacts and better resolution. The method can be applied to images where the target/background ratio approaches unity, and to single isotope imaging.

20 Claims, No Drawings

DUAL ISOTOPE SCINTIGRAPHIC IMAGE ENHANCEMENT

BACKGROUND OF THE INVENTION

The present invention relates to a method for enhancing the resolution of a dual isotope scintigraphic image, using a filter which substantially reduces edge artifacts in the subtraction image.

Scintigraphic imaging often suffers from poor resolution due to the difficulty of distinguishing the image from background radioactivity. Even the use of radiolabeled antibodies or antibody fragments which bind specifically to markers produces by or associated with a tumor, lesion, organ or tissue has not entirely solved this problem, since only a relatively small percentage of the total injected dose of labeled antibody localizes at the site of the tumor, lesion, organ or tissue. A further complication is the fact that certain tissues and organs take up immunoglobulins non-specifically, i.e., due to factors other than specific antigen-antibody binding at the recognition site of the antibody.

In order to compensate for non-specific background, it is known to use a subtraction agent and to effect a computer processed imaging program. One example of such an approach is to label a specific antibody with Iodine-131 and to inject technetium-99m, e.g., in the form of pertechnetate or technetium-labeled human serum albumin (HSA) or technetium colloid. The pertechnetate or Tc-99m-HSA is used as a blood pool subtraction agent, while the Tc-99m-colloid accretes in the liver and is used to correct for liver background.

Typically, a gamma camera is equipped with a collimator which can separately acquire counts in a high energy window and a low energy window. There is usually some scatter from the high energy to the low energy emission window. The images from the two windows are typically processed by first correcting for downscatter by multiplying the counts from the low energy window image by a scatter correction factor, normalizing to the same number of total counts in each image, and subtracting the counts of the background agent image from those of the specific label image, to produce the corrected image.

Images produced by dual isotope subtraction are often of significantly greater clarity than those without subtraction. Moreover, it is often not possible to obtain an image of a tumor, lesion, organ or tissue without subtraction, because non-specific background radioactivity is high during the time when maximum uptake of antibody has occurred and the label is emitting high counts and the activity decreases to an unacceptably low level by the time clearance of non-specific antibody has occurred to an extent where the target/background ratio is acceptable for imaging without subtraction.

Nevertheless, dual isotope subtraction planar imaging has in the past been hampered by differences in spatial resolution, attenuation, septal penetration and scatter of the two radionuclides, especially where I-131 is used for specific labeling and Tc-99m is used as a reference agent. I-131 gives rise to substantial scatter, and the I-131 images have poorer resolution and fewer counts than the Tc-99m images. Use of a conventional subtraction method, as described above, has often produced planar images having significant edge artifacts, especially at low target/background ratios. Filters of various sorts have been used in digital processing programs for single isotope scintigraphic imaging, to enhance contrast and suppress image noise, but such filtering techniques have not been applied to dual isotope subtraction.

Various methods for background compensation have been developed, including but not limited to use of a second antibody to scavenge non-target primary antibody, as disclosed in U.S. Pat. No. 4,624,846, and use of normal immunoglobulin as a reference agent, as disclosed in U.S. Pat. Nos. 4,348,376, 4,444,744, 4,460,561 and 4,331,647, referred to collectively herein as the "Goldenberg patents", the disclosures of which are incorporated by reference herein in their entireties.

A need continues to exist for an improved method of image processing for dual isotope images that avoids the edge artifacts of conventional processing techniques and which is suited to the particular imaging system and radioisotope emission characteristics which are involved in producing the image.

OBJECTS OF THE INVENTION

One object of the present invention is to provide a method for enhancing dual isotope subtraction images of tumors, lesions, organs and tissues which optimizes the information content of the image from each radioisotope.

Another object of the invention is to provide a method for digitally processing dual isotope scintigraphic images which takes cognizance of, and is tailored to, the characteristics of the imaging camera and collimator, as well as the emission characteristics of each of the radioisotopes used for the specific and background labels.

A further object of the invention is to provide a dual isotope planar imaging method which can permit images to be resolved even when the ratio of target to background counts approaches unity.

Yet another object of the invention is to provide a dual isotope imaging method which produces significantly enhanced images with I-131-labeled antibody imaging, using Tc-99m-labeled subtraction agents.

A still further object of the invention is to provide a single isotope imaging method providing acceptable resolution of small targets at target/background ratios approaching unity.

Upon further study of the specification and appended claims, further objects and advantages of this invention will become apparent to those skilled in the art.

SUMMARY OF THE INVENTION

Briefly, these objects are achieved, in a dual isotope subtraction method of imaging a tumor, lesion, organ or tissue, wherein an amount sufficient for imaging of a radiolabeled antibody or antibody fragment which specifically binds a marker produced by or associated with said tumor, lesion, organ or tissue is injected into a patient having such tumor, lesion, organ or tissue, an amount sufficient for background subtraction of a reference substance labeled with a different and separately detectable radioisotope is injected into the patient prior to scanning, the patient is scanned with a scintigraphic camera equipped with means to separately acquire emission data in energy windows corresponding to radioactive emissions from the two different radioisotope labels, as a function of the scanning position of the camera, and to store the data in digital form, said scanning being effected after a time sufficient to localize said radiolabeled antibody or antibody fragment, and the scans from the two energy windows are processed and subtracted such that the scan data from the reference label are subtracted from the scan data from the specific antibody or antibody fragment label, to produce background-compensated image data for the tumor, lesion, organ or tissue, suitable for display in a form permitting visualization of the image, by the improvement which comprises:

(a) processing the raw digital data from the scans in the two energy windows, in the spatial frequency domain, using a band pass spatial frequency filter; wherein the raw scan data for each of the radioisotopes, after normalization to the same number of total counts per image and transformation into the spatial frequency domain, are multiplied by the same filter function, determined for the less-well-resolved radioisotope (LWRR); wherein the filter function is a two-dimensional circularly symmetric Gaussian filter function, the low frequency portion of which is substantially equal to the inverse of the modulation transfer function (MTF) for the scanning camera and collimator system, the MTF is obtained from the line spread function of a line source of the LWRR, the high frequency cutoff portion of the filter is a smoothly decreasing function going to zero over a short but finite range of frequencies, a two-dimensional power spectrum of the spatial frequency domain-transformed scan data from the LWRR is formed, a one-dimensional power spectrum is formed from the two-dimensional power spectrum by averaging over annuli, the noise level is determined by averaging over the high frequency components, and the rolloff frequency of the filter is the point on the one-dimensional power spectrum which is about 1.5–3 times the noise level; and wherein the processed data are transformed back to the spatial domain; and (b) subtracting the processed data for the reference radioisotope from those of the specific antibody or antibody fragment label, to produce enhanced background-compensated image data suitable for display and visualization.

For single isotope image processing, the present invention provides, in a method of imaging a tumor, lesion, organ or tissue, wherein an amount sufficient for imaging of a radiolabeled antibody or antibody fragment which specifically binds a marker produced by or associated with said tumor, lesion, organ or tissue is injected into a patient having such tumor, lesion, organ or tissue, the patient is scanned with a scintigraphic camera equipped with means to acquire emission data corresponding to radioactive emissions from the radioisotope label, as a function of the scanning position of the camera, and to store the data in digital form, said scanning being effected after a time sufficient to localize said radiolabeled antibody or antibody fragment, to produce image data for the tumor, lesion, organ or tissue, suitable for display in a form permitting visualization of the image, the improvement which comprises:

(A) effecting said scan after a time when the ratio of (i) the radioactivity emitted by radioisotope localized at the site of said tumor, lesion, organ or tissue, to (ii) the background radioactivity emitted by non-localized radiolabel, is less than 2; and (b) processing the raw digital data from the scan in the spatial frequency domain using a band pass spatial frequency filter; wherein the raw scan data are transformed into the spatial frequency domain and multiplied by a filter function; wherein the filter function is a two-dimensional circularly symmetric Gaussian filter function, the low frequency portion of which is substantially equal to the inverse of the system modulation transfer function (MTF) for the scanning camera, the MTF is obtained from the line spread function of a line source of radioisotope, the high frequency cutoff portion of the filter is a smoothly decreasing function going to zero over a short but finite range of frequencies, a two-dimensional power spectrum of the spatial frequency domain-transformed scan data is formed, a one-dimensional power spectrum is formed from the two-dimensional power spectrum by averaging over annuli, the noise level is determined by averaging over the high frequency components, and the rolloff frequency of the filter is the point on the one-dimensional power spectrum which is about 1.5–3 times the noise level; and wherein the processed data are transformed back to the spatial domain to produce image data suitable for display and visualization.

DETAILED DISCUSSION

The present invention adapts a digital filtering method heretofore only applied to single isotope scintigraphic imaging to dual isotope imaging, but in a way which optimizes the information content of the two isotope images so that subtraction avoids artifacts and preserves as much as possible of the information content of the images as possible. Resolution of the present method is significantly enhanced and extends to images taken when target/background ratios of counts approaches unity.

The method will be illustrated with nuclear medicine imaging of tumors using I-131-labeled antitumor antibodies and antibody fragments, coupled with use of Tc-99m-pertechnetate, Tc-99m-HSA and Tc-99m-technetium-sulfur colloid as background subtraction agents. It will be understood that the method is generally applicable to use of other radioisotope pairs for imaging, I-131/I-123, Ga-67/In-111 and the like. The I-131 image is less well resolved than the Tc-99m image in this case. It gives rise to significant scatter into the low energy (Tc-99m) window and produces fewer counts per pixel than the Tc-99m image.

An important departure of the present method from conventional dual isotope subtraction methods is the use of a filter function tailored to optimization of the information in the less well resolved isotope image for refining both that image and the image from the other isotope image. This has the effect of substantially equalizing the information content of the two images prior to subtraction, without loss of excessive information from the less well resolved image. It is not necessary to correct for downscatter in this method, since this is accomplished along with the image enhancement during the image filtering process.

The basic steps of the present method are set forth below, and further details of each step will follow the general outline. The method assumes that a subject, e.g., a cancer patient, is injected with an I-131-labeled antibody or antibody fragment which specifically binds to a marker produced by or associated with the type of tumor (or lesion, organ or tissue) to be imaged. Prior to imaging, the Tc-99m subtraction agents are injected. Images are acquired using a gamma scanning camera equipped with a high energy collimator, and images are typically taken at 364 keV ($\pm 20\%$) and 140 keV ($\pm 20\%$) for the I-131 and Tc-99m images, respectively. The images are stored in digital form in a suitable conventional matrix array for subsequent processing. The processing is effected as follows: I-131 image;

1. Normalize total counts to a preselected number (optional).
2. Transform image by forward Fourier Transform (FT) from spatial domain to spatial frequency domain.
3. Create power spectrum from two-dimensional (2-D) FT.
4. Create one-dimensional (1-D) power spectrum by averaging over annuli in the 2-D power spectrum.
5. Determine 1-D filter.
6. Create symmetric 2-D filter from 1-D filter.
7. Multiply 2-D FT by 2-D filter.
8. Inverse 2-D FT to convert process image back to spatial domain. Tc-99m image:
9. Normalize total counts to same total counts as I-131 image.
10. Forward 2-D FT.
11. Multiply 2-D FT by same 2-D filter generated with I-131 (steps 3–6).
12. Inverse 2-D FT.
Subtraction:
13. Subtract filtered Tc-99m image from filtered I-131 image, pixel by pixel, to obtain enhanced image, which can then be displayed as a shaded black and white image or as a graded color image, using conventional display software.

The normalization of counts in step 9 must be done, so that the total counts for the Tc-99m image is equal to that for the I-131 image. This can be done by normalizing counts for both images to a convenient number or by normalizing only one image, typically the Tc-99m image having the higher number of total counts, to the number of counts obtained for the I-131 image.

The 2-D FT is effected by conventional means, using well-known software.

The 2-D power spectrum is created by taking the square of the information in the 2-D FT, and the 1-D power spectrum is conventionally obtained by averaging over annuli in the 2-D power spectrum.

Determination of the 1-D filter involves several steps. First, a circularly symmetric Gaussian function is selected. In related imaging using a single isotope, e.g., that disclosed by Madsen et al., J. Nucl. Med., 26:395–402, 1985, a band pass spatial frequency filter was selected having the formula $$F(u) = e^{(u-u_0)^2/2\sigma^2} u \geq 0$$

where u is spatial frequency, $u_o$ is the displacement of the Gaussian from the origin and $\sigma$ specifies the spread. The rolloff frequency, $u_c$, was chosen such that $u_c - u_o = 2$, and the filter was set at 0.3 at the origin. This function had certain advantages but was unrelated to the imaging characteristics of the camera.

The Gaussian chosen for the present method can include the Madsen function, but preferably is related to the characteristics of the camera, e.g., the inverse of the modulation transfer function (MTF) for the system of camera and collimator used to acquire the images. This need only be determined once for the system. Typically, the MTF is determined by taking an image of a line source of the less well resolved radioisotope, in this I-131, e.g., by using a thin capillary tube containing a solution of the isotope, taking a perpendicular profile of the resultant image to produce a line spread function (normally a Gaussian function of distance from the line), and taking a FT of the line spread function to produce the MTF in the spatial frequency domain.

The low frequency portion of the filter function is 1/MTF. The high frequency cutoff portion is a smoothly decreasing function which goes to zero over a relatively short but finite range of frequencies. The point where the rolloff begins, i.e., the rolloff frequency, is determined from the 1-D power spectrum of the I-131 image. The power spectrum of noise is essentially flat, oscillating about an average value at high frequency. The rolloff frequency is determined by taking the point on the 1-D power spectrum which exceeds the noise level by a statistically significant factor, typically a point where the power spectrum is from about 1.5 to about 3 times the noise level, preferably about twice the noise level. The cutoff is a smoothly decreasing function going to zero within a short but finite frequency range.

There are many advantages to using the preferred filter function where the low frequency end is 1/MTF for the less well resolved isotope. The filter smooths the image and boosts the low frequency. The filter function is related to the characteristics of the camera, so that the filter profile reflects the detector response curve of the camera, taking into account the collimator effect upon the response.

A particularly unusual feature of the present method is that the filter is optimized for the characteristics of the less well resolved isotope and then applied to the image of both that isotope and the better resolved isotope. This substantially equalizes the information content of the two isotope images and converts them to comparable idealized images, so that subtraction produces a significantly enhanced planar image. The MTF drops off from 1 to 0 faster for I-131, the less well resolved isotope image, than for the Tc-99m image. Thus, selection of 1/MTF for the image using the isotope where the MTF drops off fastest preserves more useful imaging information. Since the prior art only discloses this type of spatial frequency filter for single isotope imaging, e.g., SPECT imaging, the advantages of application to dual isotope imaging using the same filter for the two different isotope images would not be apparent.

It will be appreciated that imaging can be achieved with intact antibody, e.g., IgG, or an antibody fragment, e.g., a F(ab')$_2$ Fab' or Fab fragment, as well as various hybrid or other naturally or synthetically produced monoclonal or polyclonal antibodies or fragments.

Comparative studies of conventional subtraction and the present method for I-131 imaging with Tc-99m subtraction were effected using a liver phantom. The phantom is a transparent liver-shaped container, having provision for insertion of various sized spheres (representing a "tumor") containing a solution of the imaging radioisotope, and provision for introduction into the surrounding space (representing the "background") of a solution containing both the imaging isotope and the subtraction agent isotope, in selected ratios of "tumor" to "background" counts.

The studies have shown that images of a 4 cm diameter "tumor" can be resolved with a tumor/background ratio of counts approaching unity. Comparison with conventional digital image processing, with correction for downscatter, normalization of total counts and subtraction of the Tc-99m image from the I-131 image, could not resolve a 4 cm tumor at tumor/background ratios below about 2. Even a 1 cm "tumor" could be resolved using the present method, with tumor/background ratios approaching unity. These studies show the enhancement which the present method is capable of producing.

Application of the dual isotope scintigraphic image enhancement method of the present invention to actual patient tumor planar imaging data has produced marked enhancement of the images. The fact that resolution of small tumors can be achieved with tumor/background ratios of less than 2, e.g., about 1.8, 1.6, 1.4, 1.2, or even about 1, represents a breakthrough for planar imaging, since it had been thought that 2 was the lower limit of tumor/background ratio for which resolution would be acceptable for planar dual isotope subtraction imaging.

Use of normal immunoglobulin as the subtraction agent, rather than less comparable agents such as pertechnetate, HSA and radiometal colloids, will also benefit from the improved processing of the present method. Also, images taken after scavenging with a second antibody will be improved. In fact, application of the preferred function of the present invention to single isotope planar images, without subtraction, but where the image is taken when the target/background ratio is less than 2, e.g., about 1.9, 1.8, 1.7, 1.6, 1.5, 1.4, 1.3, 1.2, 1.1 or even about 1, represents a new application of digital image processing which is not suggested by the prior art and which is unexpected in light of the uniform dogma in the art that at least a ratio of 2 is required for acceptable resolution of planar images.

Application of the filter function used for dual isotope subtraction to single isotope imaging, particularly planar imaging, at lower target/background ratios than heretofore considered minimal, represents a further refinement in the art. Especially for resolution of small targets, e.g., targets such as tumors having a rough diameter of about 4 cm, especially 3 cm, 2 cm, 1 cm or smaller, the success of this method is unexpected. When used in combination with second isotope scavenging, this can greatly expand the power of nuclear medicine imaging for detection and location of metastatic tumors and small abscesses, and for imaging organs and tissues. This is especially the case when antibody fragments are used for imaging, e.g., (F(ab')$_2$, Fab' and Fab fragments. These fragments permit imaging sooner than whole immunoglobulin, but also often localize to a lesser extent in tumor and at a lower tumor/background ratio.

From the foregoing description, one skilled in the art can easily ascertain the essential characteristics of this invention, and, without departing from the spirit and scope thereof, can make various changes and modifications of the invention to adapt it to various usages and conditions.

What is claimed is:

1. In a dual isotope subtraction method of imaging a tumor, lesion, organ or tissue, wherein an amount sufficient for imaging of a radiolabeled antibody or antibody fragment which specifically binds a marker produced by or associated with said tumor, lesion, organ or tissue is injected into a patient having such tumor, lesion, organ or tissue, an amount sufficient for background subtraction of a reference substance labeled with a different and separately detectable radioisotope is injected into the patient prior to scanning, the patient is scanned with a scintigraphic camera equipped with means to separately acquire emission data in energy windows corresponding to radioactive emissions from the two different radioisotope labels, as a function of the scanning position of the camera, and to store the data in digital form, said scanning being effected after a time sufficient to localize said radiolabeled antibody or antibody fragment, and the scans from the two energy windows are processed and subtracted such that the scan data from the reference label are subtracted from the scan data from the specific antibody or antibody fragment label, to produce background-compensated image data for the tumor, lesion, organ or tissue, suitable for display in a form permitting visualization of the image, the improvement which comprises:

(a) processing the raw digital data from the scans in the two energy windows, in the spatial frequency domain, using a band pass spatial frequency filter; wherein the raw scan data for each of the radioisotopes, after normalization to the same number of total counts per image and transformation into the spatial frequency domain, are multiplied by the same filter function, determined for the less-well-resolved radioisotope (LWRR); wherein the filter function is a two-dimensional circularly symmetric Gaussian filter function, the low frequency portion of which is substantially equal to the inverse of the modulation transfer function (MTF) for the scanning camera and collimator system, the MTF is obtained from the line spread function of a line source of the LWRR, the high frequency cutoff portion of the filter is a smoothly decreasing function going to zero over a short but finite range of frequencies, a two-dimensional power spectrum of the spatial frequency domain-transformed scan data from the LWRR is formed, a one-dimensional power spectrum is formed from the two-dimensional power spectrum by averaging over annuli, the noise level is determined by averaging over the high frequency components, and the rolloff frequency of the filter is the point on the one-dimensional power spectrum which is about 1.5–3 times the noise level; and wherein the processed data are transformed back to the spatial domain; and (b) subtracting the processed data for the reference radioisotope from those of the specific antibody or antibody fragment label, to produce enhanced background-compensated image data suitable for display and visualization.

2. The method of claim 1, wherein the specific antibody or antibody fragment is labeled with Iodine-131, and the reference substance is labeled with Technetium-99m.

3. The method of claim 1, wherein an antibody fragment is used for imaging, said fragment being a F(ab')$_2$, Fab' or Fab fragment.

4. The method of claim 3, wherein said fragment is a Fab' or Fab fragment.

5. The method of claim 1, wherein said reference substance is the normal immunoglobulin or immunoglobulin fragment corresponding to the specific antibody or antibody fragment.

6. The method of claim 1, wherein the image is a two-dimensional planar image.

7. The method of claim 1, wherein the target imaged is a tumor.

8. The method of claim 1, wherein the target/background ratio of raw counts in the image is less than about 2.

9. The method of claim 8, wherein the target/background ratio of raw counts in the image is about 1.6.

10. The method of claim 8, wherein the target/background ratio of raw counts in the image is about 1.2.

11. The method of claim 1, wherein the rolloff frequency of the filter is the point on the one-dimensional power spectrum which is about twice the noise level.

12. In a method of imaging a tumor, lesion, organ or tissue, wherein an amount sufficient for imaging of a radiolabeled antibody or antibody fragment which specifically binds a marker produced by or associated with said tumor, lesion, organ or tissue is injected into a patient having such tumor, lesion, organ or tissue, the patient is scanned with a scintigraphic camera equipped with means to acquire emission data corresponding to radioactive emissions from the radioisotope label, as a function of the scanning position of the camera, and to store the data in digital form, said scanning being effected after a time sufficient to localize said radiolabeled antibody or antibody fragment, to produce image data for the tumor, lesion, organ or tissue, suitable for display in a form permitting visualization of the image.

the improvement which comprises:
(a) effecting said scan after a time when the ratio of (i) the radioactivity emitted by radioisotope localized at the site of said tumor, lesion, organ or tissue, to (ii) the background radioactivity emitted by non-localized radiolabel, is less than about 2; and
(b) processing the raw digital data from the scan in the spatial frequency domain, using a band pass spatial frequency filter; wherein the raw scan data are transformed into the spatial frequency domain and multiplied by a filter function; wherein the filter function is a two-dimensional circularly symmetric Gaussian filter function, the low frequency portion of which is substantially equal to the inverse of the system modulation transfer function (MTF) for the scanning camera, the MTF is obtained from the line spread function of a line source of radioisotope, the high frequency cutoff portion of the filter is a smoothly decreasing function going to zero over a short but finite range of frequencies, a two-dimensional power spectrum of the spatial frequency domain-transformed scan data is formed, a one-dimensional power spectrum is formed from the two-dimensional power spectrum by averaging over annuli, the noise level is determined by averaging over the high frequency components, and the rolloff frequency of the filter is the point on the one-dimensional power spectrum which is about twice the noise level; and wherein the processed data are transformed back to the spatial domain to produce image data suitable for display and visualization.

13. The method of claim 12, wherein an antibody fragment is used for imaging, said fragment being a F(ab')$_2$, Fab' or Fab fragment.

14. The method of claim 13, wherein said fragment is a Fab' or Fab fragment.

15. The method of claim 12, wherein the image is a two-dimensional planar image.

16. The method of claim 12, wherein the target imaged is a tumor.

17. The method of claim 12, wherein the target/background ratio of raw counts in the image is less than about 2.

18. The method of claim 17, wherein the target/background ratio of raw counts in the image is about 1.6.

19. The method of claim 17, wherein the target/background ratio of raw counts in the image is about 1.2.

20. The method of claim 12, wherein the rolloff frequency of the filter is the point on the one-dimensional power spectrum which is about twice the noise level.

* * * * *